United States Patent [19]

DuBois et al.

[11] 4,194,609
[45] Mar. 25, 1980

[54] SPEED AND CLUTCH CONTROL FOR ENGINES INCLUDING SHIFT INTERLOCK

[75] Inventors: Edmund H. DuBois, Zion, Ill.; John D. Sheldon, Charlotte, N.C.

[73] Assignee: Outboard Marine Corporation, Waukegan, Ill.

[21] Appl. No.: 849,012

[22] Filed: Nov. 7, 1977

[51] Int. Cl.² .............................................. G05G 9/08
[52] U.S. Cl. .................................... 192/0.096; 74/878
[58] Field of Search ................. 192/0.098, 0.096; 74/875, 878

[56] References Cited

U.S. PATENT DOCUMENTS

| | | | |
|---|---|---|---|
| 2,493,592 | 1/1950 | Peabody | 74/878 |
| 2,716,474 | 8/1955 | Parish | 192/0.098 |
| 2,771,168 | 11/1956 | Parish | 192/0.098 |
| 2,785,584 | 3/1957 | Hambleton | 192/0.098 |
| 2,906,251 | 9/1959 | Soder | 123/117 R X |
| 2,988,929 | 6/1961 | Williams | 192/0.098 X |

Primary Examiner—George H. Krizmanich
Attorney, Agent, or Firm—Michael, Best & Friedrich

[57] ABSTRACT

Disclosed herein is a control for the throttle valve and clutch of an engine, including a timer plate which is oscillated to concurrently adjust the spark and the setting of the throttle valve and a shift lever for shifting the engine clutch. The control includes a shift interlock which is connected to the shift lever for movement in response to movement of the shift lever and a radially outwardly extending projection on the timer plate. The shift interlock includes a portion which is located to extend into the travel path of the timer plate projection and is engageable with the timer plate projection for selectively controlling the setting of the throttle valve in accordance to the position of the shift lever and for selectively controlling the position of the shift lever in accordance with the setting of the throttle valve. A spring member formed as an integral part of the shift interlock releasably engages a detent pin to positively retain the shift lever in any one of its positions.

4 Claims, 6 Drawing Figures

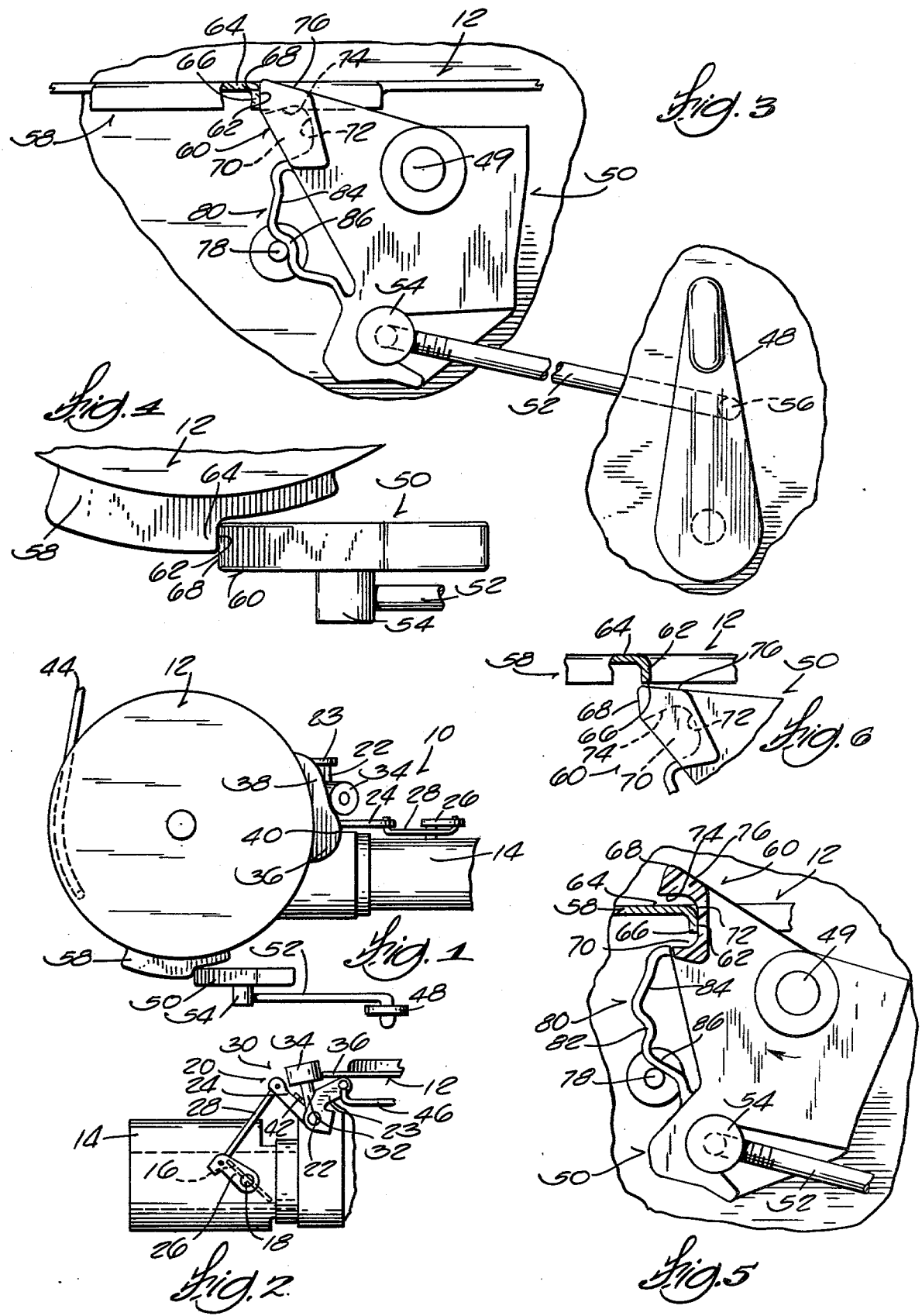

SPEED AND CLUTCH CONTROL FOR ENGINES INCLUDING SHIFT INTERLOCK

BACKGROUND OF THE INVENTION

This invention relates to engine speed and clutch controls including a shift interlock and, more particularly, to such controls for engines wherein speed control is provided by the coordinated or interrelated operation of a timer plate and a throttle valve.

In many engines, particularly two-cycle engines, speed control is effected in part by the timing and in part by movement of the throttle valve. Speed control mechanism including a connection between the timer plate and the throttle valve for concurrent operation of these two speed controlling devices are known. Examples of prior art speed control mechanisms of this type are disclosed in the Shimanckas U.S. Pat. No. 2,723,655, issued Nov. 15, 1955, the Soder U.S. Pat. No. 2,906,251, issued Sept. 29, 1959, and the Williams U.S. Pat. No. 2,988,929, issued June 20, 1961.

Interlocking mechanisms for controlling throttle advancement in accordance with the setting of the clutch and for controlling shifting of the clutch in accordance with the throttle setting are also known.

One type of interlocking mechanism includes a part on the timer plate which is arranged to interengage a movable shift interlock connected to the shift lever for movement therewith and means for releasably retaining the shift lever in the neutral, forward and reverse positions. Such means typically is quite complex and includes a plurality of parts.

SUMMARY OF THE INVENTION

This invention provides a control for the throttle valve and clutch of an engine, which control includes a timer plate mounted for movement to adjust engine spark and operatively connected to the throttle valve whereby the throttle valve is moved between high speed and low speed settings in response to movement of the timer plate, a shift lever mounted for movement between a neutral and forward and reverse positions and adapted to actuate the engine clutch in response to movement of the shift lever, a movable shift interlock connected to the shift lever for movement in response to movement of the shift lever, means connecting the timer plate with the shift interlock for selectively controlling the setting of the throttle valve in accordance to the position of the shift lever and for selectively controlling the position of the shift lever in accordance with the setting of the throttle valve, and detent means including an integral part on the shift interlock for selectively and releasably retaining the shift lever in the neutral, forward and reverse positions.

In one embodiment, the detent means includes a fixed pin located adjacent the shift interlock and the integral part on the shift interlock comprises a spring member having separate portions situated at locations corresponding to the neutral, forward and reverse positions for receiving and releasably engaging the pin means.

In another embodiment, the separate portions on the spring member includes an indentation situated at a location corresponding to the neutral position of the shift lever and inclined ramp portions which extend in opposite directions from the indentation and bear against the pin means to maintain a preload on the shift lever when the shift interlock is moved from the neutral position to the forward and reverse positions.

In a further embodiment, the spring member and the shift interlock is a one-piece unit.

One of the principal features of the invention is the provision of a control for the throttle valve and clutch of an engine, which control includes a speed control means, a shift interlock connected to a clutch shift lever for movement therewith, and interengaging means on the speed control means and on the shift interlock for selectively controlling the setting of the engine throttle valve in accordance with the position of the shift lever and for selectively controlling the position of the shift lever in accordance with the setting of the throttle valve.

Another of the principal features of the invention is the provision of such a control including detent means associated with the shift interlock for positively releasably retaining the shift lever in the neutral, forward and reverse positions.

Other aspects and features of the invention will become apparent to those skilled in the art upon reviewing the following detailed description, the drawing, and the appended claims.

BRIEF DESCRIPTION OF THE DRAWINGS

FIG. 1 is a top plan, fragmentary view of an internal combustion engine incorporating a throttle and clutch control embodying various of the features of the invention.

FIG. 2 is a side view of some of the parts shown in the righthand portion of FIG. 1, which parts have been rotated 180° from their locations in FIG. 1.

FIG. 3 is a fragmentary, partially broken away, side view of some of the parts shown in FIG. 1, which parts are illustrated on a somewhat enlarged scale and are shown in the location when the engine clutch is in the neutral position.

FIG. 4 is a fragmentary top view of some of the parts shown in the lefthand portion of FIG. 3.

FIG. 5 is a view similar to the lefthand portion of FIG. 3 showing the location of certain parts when the engine clutch is in the reverse position and the engine throttle is at an advanced speed setting.

FIG. 6 is a fragmentary view similar to FIG. 5 showing the location of certain parts when the engine clutch is in the forward position and the engine throttle is at an advanced speed setting.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

GENERAL DESCRIPTION

Illustrated fragmentarily in the drawing (FIGS. 1 and 2) is a conventional internal combustion engine 10 for an outboard motor incorporating a throttle and clutch control embodying various of the features of the invention.

The engine 10 includes a timer plate 12 which is arranged in a conventional manner and is oscillatable in opposite rotary directions for adjusting the spark advance. The spark is advanced by rotation of the timer plate 12 in a counterclockwise direction as viewed in FIG. 1.

The engine 10 also includes a carburetor 14 having a throttle engine 16 mounted on a shaft 18. Movement of the throttle valve 16 between low speed and high speed settings is effected through a linkage arrangement including a lever yoke 20 which is rotatably mounted on a stud 22, has an outer arm 23, and has an inner arm 24 connected to a rocker arm 26 fixedly mounted on the throttle valve shaft 18 by a link 28. The throttle valve 16 is shown at an intermediate speed setting in FIG. 2.

Pivotally mounted on the stud 22 between the outer arm 23 and the inner arm 24 of the lever yoke 20 is a cam follower 30 including the arm 32 and a cam follower roller 34. Located on the timer plate 12 for moving the throttle valve 16 in response to rotation of the timer plate 12 is a cam 36 having a portion 38 which is nearly concentric with the rotational axis of the timer plate 12 and a portion 40 having an increasing radius in the spark advancing direction of the timer plate 12, i.e., in the counterclockwise direction as viewed in FIG. 1. These cam portions successfully engage the cam follower roller 34 as the timer plate 12 is rotated to advance the spark and increase engine speed. As the cam portion 40 starts to engage the cam follower roller 34, the cam follower 30 is rotated in a counterclockwise direction as viewed in FIG. 2, causing the cam follower arm 32 to engage a lug 42 on the lever yoke inner arm 24 and opening movement thereafter is transmitted to the throttle valve 16 via the link 28 and the rocker arm 26.

Various conventional means can be used for rotating the timer plate 12 to control the spark advance and concurrently control the setting of the throttle valve 16. In the specific construction illustrated, such means includes a rocker arm 44 (shown fragmentarily in FIG. 1) suitably connected at one end to the timer plate 12 and operatively connected at the other end to a remotely located speed control (not shown), such as a hand grip mounted on the end of the outboard motor tiller and arranged in the manner disclosed in the above-identified Soder U.S. Pat. No. 2,906,251 which is incorporated herein by reference.

Separate means can be provided for controlling the setting of the throttle valve 16. In the specific construction illustrated, such means includes (FIG. 2) a link 46 connected at one end to the outer arm 23 of the lever yoke 20 and operatively connected at the other end to the above-mentioned remotely located speed control (not shown).

Actuation of the engine clutch (not shown) is controlled (FIG. 3) by a rotatably mounted shift lever 48 which is operatively connected to the engine clutch by suitably means (not shown) and is rotatable in opposite directions from a neutral position. The engine clutch is shifted to forward and reverse settings by respectively rotating the shift lever 48 clockwise and counterclockwise from the neutral position shown in FIG. 3.

Rotatably mounted on a fixed pivot 49 is a shift interlock 50 which is connected to the shift lever 48 for rotational movement in response to movement of the shift lever 48 from the neutral position by a link 52 having one end pivotally connected at 54 to the shift interlock 50 and the other end pivotally connected at 56 to the shift lever 48.

Interengaging means are provided on the timer plate 12 and on the shift interlock 50 for controlling the setting of the throttle valve 16 in accordance with the position of the shift lever 48 and for controlling the position of the shift lever 48 in accordance with the setting of the throttle valve 16. More specifically, such interengaging means includes a radially outwardly extending projection 58 on the timer plate 12 and a portion 60 on the shift interlock 50 located to extend into the travel path of the timer plate projection 58 during spark advancing movement of the timer plate 12 when the shift lever 48, and thus the shift interlock 50, is in either the neutral position or the reverse position.

The timer plate projection 58 has a leading edge 62 with respect to the spark advancing direction of the timer plate 12 and opposed first and second outer edges or areas 64 and 66 extending from the leading edge 60.

The shift interlock portion 60 includes a first surface 68 which is located in the travel path of the timer plate projection 58 and is engaged by the leading edge 62 thereof when the shift lever 48 is located in the neutral position shown in FIGS. 3 and 4 and the timer plate 12 is subsequently moved in a spark advancing position. Thus, the first surface 68 on the shift interlock portion 60, in cooperation with the timer plate projection 58, serves to limit the advanced speed setting of the throttle valve 16 to a first predetermined level when the engine is in neutral.

The shift interlock portion 60 also includes a recess 70 which is located to receive the timer plate projection 58 when the shift lever 48 is in the reverse position shown in FIG. 5 and the timer plate 12 subsequently is moved in a spark advancing direction. The recess 70 has an inner wall or second surface 72 which is engaged by the leading edge 62 of the timer plate projection 58. Thus, the second surface 72 on the shift interlock portion 60, in cooperation with the timer plate projection 58, serves to limit the advanced speed setting of the throttle valve 16 to a second predetermined level when the engine is in reverse.

As best shown in FIG. 5, the recess 70 also has an upper wall or third surface 74 which extends from the second surface 72 and is located to engage the top surface or first area 64 of the timer plate projection 58 when movement of the shift lever 48 from the reverse position toward the neutral position is attempted with the timer plate 12 at a spark advancing position corresponding to the second predetermined advanced speed setting of the throttle valve 16. Thus, the third surface 74 on the shift interlock portion 60, in cooperation with the timer plate projection 58, serves to prevent shifting of the engine clutch from reverse to neutral when the throttle valve 16 is at an advanced speed setting at or slightly below the second predetermined level.

The shift interlock portion 60 further includes an upper or fourth surface 76 which, as best shown in FIG. 6, is located to engage the lower surface or second area 66 of the timer plate projection 58 when the timer plate 12 has been moved past a position corresponding to the first predetermined advanced speed setting of the throttle valve 16 with the shift lever 48 and, thus the shift interlock 50, in the forward position. Thus, the fourth surface 76 on the shift interlock portion 60, in cooperation with the timer plate projection 58, serves to prevent the engine clutch from being shifted from forward to neutral when the throttle valve 16 is at an advanced speed setting above the first predetermined level.

The shift interlock 50 is provided with an integral detent means for selectively and releasably retaining the shift lever 48 in the neutral, forward and reverse positions. In the specific construction illustrated, such detent means (FIGS. 3 and 5) include a fixed detent pin 78 located adjacent the shift interlock 50 and an integral spring member 80 on the shift interlock 50. The spring member 80 includes a central undulation 82 which is situated at a location corresponding to the neutral position of the shift lever 48, and is arranged to receive and releasably engage the detent pin 80 when the shift lever 48, and thus the shift interlock 50, is moved to the neutral position.

Extending in opposite directions from the indentation 82 are inwardly inclined ramp portions 84 and 86 which bear against the detent pin 80 as the shift lever 48, and thus the shift interlock 50, respectively is moved from the neutral position toward the forward position and from the neutral position toward the reverse position. Thus, the ramp portions 84 and 86 maintain a preload on the link 52 which preload is transmitted to the shift lever 48 and the shift lever 48 is thereby positively and releasably retained in the forward and reverse positions.

In order to simplify fabrication and assembly, the shift interlock 50 and the spring member 80 preferably are formed as a one-piece unit.

Various of the features of the invention are set forth in the following claims.

What is claimed is:

1. A control for the throttle valve and clutch of an engine, said control comprising a timer plate mounted for movement to adjust engine spark and operatively connected to said throttle valve whereby said throttle valve is moved between low speed and high speed settings in response to movement of said timer plate, a shift lever mounted for movement between a neutral position and forward and reverse positions and adapted to actuate the clutch in response to movement of said shift lever, a movable shift interlock connected to said shift lever for movement in response to movement of said shift lever, interengaging means on said timer plate and on said shift interlock for selectively controlling the setting of said throttle valve in accordance to the position of said shift lever and for selectively controlling the position of said shift lever in accordance with the setting of said throttle valve, and detent means independent of said shift lever and including an integral part on said shift interlock for selectively and releasably retaining said shift lever in the neutral, forward and reverse positions.

2. A control according to claim 1 wherein said detent means includes a fixed pin means located against said shift interlock and said integral part comprises a spring member on said shift interlock having separate portions situated at locations corresponding to the neutral, forward and reverse positions of said shift lever for receiving and releasably engaging said pin means as said shift lever, and thus said shift interlock, is moved from one position to another.

3. A control according to claim 2 wherein said separate portions on said spring member includes an indentation situated at a location corresponding to the neutral position of said shift interlock and inclined ramp portions which extend in opposite directions from said indentation and which bear against said pin means to maintain a preload on said shift lever when said shift interlock is moved from the neutral position to the forward and reverse positions.

4. A control according to claim 3 wherein said spring member and said shift interlock is a one-piece unit.

* * * * *